(12) United States Patent
Dlugoss

(10) Patent No.: US 8,408,516 B2
(45) Date of Patent: Apr. 2, 2013

(54) FLUID PRESSURE CONTROL DEVICE WITH INTEGRATED PRESSURE SENSOR

(75) Inventor: Randall B. Dlugoss, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 545 days.

(21) Appl. No.: 12/430,177

(22) Filed: Apr. 27, 2009

(65) Prior Publication Data
US 2010/0269632 A1    Oct. 28, 2010

(51) Int. Cl.
*F16K 31/02*    (2006.01)
(52) U.S. Cl. ................. 251/129.04; 251/129.15
(58) Field of Classification Search ............ 251/129.04, 251/129.05, 129.08, 129.15; 137/487.5, 137/557, 625.65, 625.69; 700/21, 32, 281, 700/282; 303/119.1, 119.2; 123/458
See application file for complete search history.

(56) References Cited

U.S. PATENT DOCUMENTS

| | | | | |
|---|---|---|---|---|
| 4,399,836 A * | 8/1983 | de Versterre et al. ...... | 137/487.5 |
| 4,796,661 A * | 1/1989 | Hishinuma et al. ........ | 137/487.5 |
| 5,593,132 A * | 1/1997 | Hrytzak .................... | 251/129.15 |
| 5,730,165 A * | 3/1998 | Philipp ..................... | 137/1 |
| 6,116,269 A * | 9/2000 | Maxson .................... | 137/487.5 |
| 6,155,233 A * | 12/2000 | Wade et al. ............... | 123/458 |
| 6,198,369 B1 * | 3/2001 | Ward et al. ................ | 335/220 |
| 6,199,575 B1 * | 3/2001 | Widner ..................... | 137/227 |
| 6,374,679 B1 * | 4/2002 | Babala et al. ............. | 73/715 |
| 6,422,206 B1 * | 7/2002 | Wade et al. ............... | 123/458 |
| 6,725,877 B2 * | 4/2004 | Liorati et al. ............. | 137/486 |
| 6,745,634 B2 * | 6/2004 | Beck et al. ................ | 73/756 |
| 7,383,851 B2 * | 6/2008 | Jacobsen et al. .......... | 137/14 |
| 7,628,137 B1 * | 12/2009 | McAlister ................. | 123/297 |
| 7,950,413 B2 * | 5/2011 | Fleischer et al. .......... | 137/487.5 |
| 2005/0082502 A1 * | 4/2005 | Patterson et al. ......... | 251/129.04 |
| 2005/0151103 A1 * | 7/2005 | Kubota et al. ............ | 251/129.15 |
| 2009/0065719 A1 * | 3/2009 | Stoever ..................... | 251/129.01 |
| 2010/0294373 A1 * | 11/2010 | Haller et al. .............. | 137/1 |

FOREIGN PATENT DOCUMENTS

| CN | 2804830 Y | 8/2006 |
|---|---|---|
| CN | 101111810 A | 1/2008 |

* cited by examiner

*Primary Examiner* — Eric Keasel
*Assistant Examiner* — Matthew W Jellett
(74) *Attorney, Agent, or Firm* — Quinn Law Group, PLLC

(57) ABSTRACT

Provided is a fluid pressure control device that includes an actuator and a body configured to house the actuator. The body has an opening arranged to receive pressurized fluid. The fluid pressure control device additionally includes a pressure sensor incorporated into the body relative to the opening to sense fluid pressure and to generate an electrical signal indicative of the sensed pressure. Furthermore, the fluid pressure control device includes an integrated circuit incorporated into the body, and operatively connected to the pressure sensor. The integrated circuit includes a transceiver configured to communicate with an external device by transmitting the electrical signal indicative of the sensed fluid pressure to the external device and receiving a control signal from the external device. The integrated circuit additionally includes a driver configured to power the actuator in response to the control signal.

18 Claims, 3 Drawing Sheets

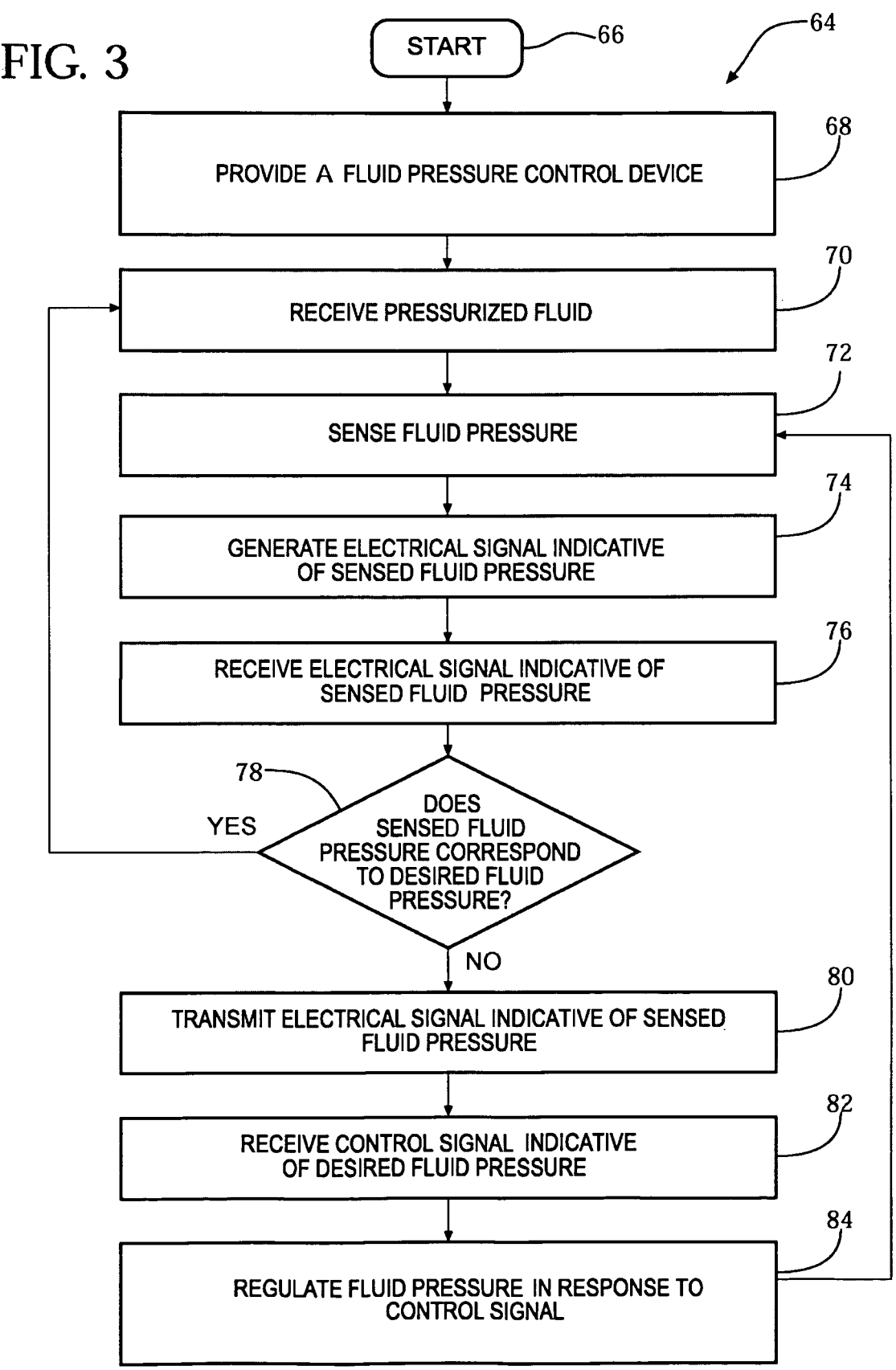

FLUID PRESSURE CONTROL DEVICE WITH INTEGRATED PRESSURE SENSOR

TECHNICAL FIELD

The present invention relates to fluid pressure control devices, and, more particularly, to fluid pressure control devices with integrated pressure sensors.

BACKGROUND OF THE INVENTION

Pressure control devices are frequently employed to regulate and channel flows of fluids, i.e. liquids or gases. Such pressure control devices often utilize electro-mechanical transducers, such as solenoids, to actuate hydraulic or pneumatic valves in order to regulate fluid flow.

Typically, fluid regulation via a solenoid is accomplished with an open-loop type of control, i.e. control input to the system is computed based on the system's current state and an existing system model. Hence, any system having its fluid flow regulated in such fashion generally lacks feed-back to determine whether the control solenoid input has achieved a desired outcome.

In automotive applications, pressure control devices employing solenoids are often utilized in automatic transmissions to regulate flow of oil into and throughout the subject transmission. In automatic transmissions, such pressure control devices are usually installed in transmission valve bodies, or in transmission control units or modules, and are employed to gain precise control of transmission shift patterns and gear ratios.

SUMMARY OF THE INVENTION

In view of the foregoing, a fluid pressure control device that includes an actuator and a body configured to house the actuator is provided. The body has an opening arranged to receive pressurized fluid. The fluid pressure control device additionally includes a pressure sensor incorporated or integrated into the body relative to the opening to sense fluid pressure and to generate an electrical signal indicative of the sensed pressure. Furthermore, the fluid pressure control device includes an integrated circuit (IC) incorporated into the body, and operatively connected to the pressure sensor. The integrated circuit includes a transceiver configured to communicate with an external device by transmitting the electrical signal indicative of the sensed fluid pressure to the external device and receiving a control signal from the external device. The integrated circuit additionally includes a driver configured to power the actuator in response to the control signal.

The fluid pressure control device may also include a face plate for covering the opening. The pressure sensor and the integrated circuit may be incorporated into the face plate.

The transceiver may be configured to communicate with the external device via a serial communication arrangement, and use a power line technique for such communication. In the alternative, the transceiver may be configured to communicate with the external device via a wireless arrangement. The control signal from the external device may be generated based on the electrical signal indicative of the sensed fluid pressure in a feed-back control loop.

The integrated circuit may also include one of an analog to digital signal converter and a digital to analog signal converter.

The fluid pressure control device may be employed in a motor vehicle transmission, and a method for controlling fluid pressure inside such a transmission is also provided.

A method for regulating fluid pressure inside a motor vehicle transmission is also provided. The method includes providing a fluid pressure control device having a body, an actuator, a pressure sensor and an integrated circuit incorporated into the body. The integrated circuit includes a transceiver and a driver. The method additionally includes receiving pressurized fluid via the fluid pressure control device, and sensing fluid pressure via the pressure sensor. The method further includes generating an electrical signal indicative of the sensed fluid pressure via the pressure sensor, and receiving the electrical signal indicative of the sensed fluid pressure via the integrated circuit. Furthermore, the method includes transmitting the electrical signal indicative of the sensed fluid pressure to an external device via the transceiver, receiving a control signal from the external device; and powering the actuator via the driver in response to the control signal to regulate the fluid pressure inside the transmission.

The method may also include providing the body of the fluid pressure control device with an opening and a faceplate to cover the opening, and incorporating the integrated circuit into the face plate. Furthermore, the method may employ either a serial communication arrangement or a wireless arrangement for transmitting the electrical signal and receiving the control signal via the transceiver. The method may additionally include generating a fluid pressure feed-back control loop by sensing regulated fluid pressure inside the transmission via the pressure sensor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 schematically illustrates, in flow chart format, a method for controlling fluid pressure via a control solenoid as shown in FIGS. 1 and 2.

DESCRIPTION OF THE PREFERRED EMBODIMENTS

Figure 1:
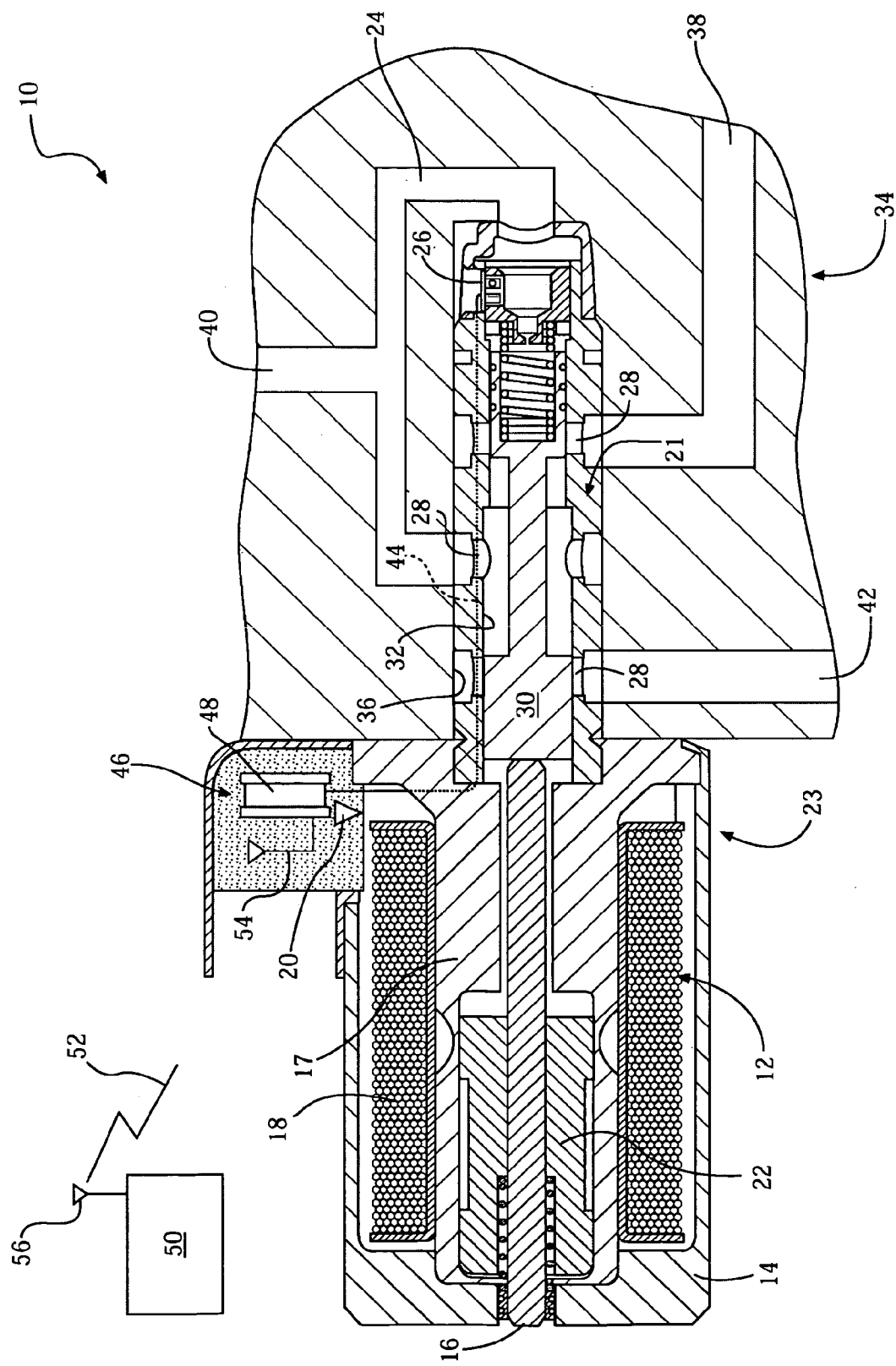
FIG. 1 is a cross-sectional schematic view of a fluid pressure control device engaged in a transmission valve body according to a first embodiment.

Referring to the drawings, wherein like reference numbers refer to like components, FIG. 1 shows a fluid pressure control device 10 according to a first embodiment, as employed in an automatic transmission (not shown) of a motor vehicle. Fluid pressure control device 10 includes a solenoid 12. Solenoid 12 is a typical electro-mechanical transducer that includes a solenoid housing 14 for enclosing an actuator or a plunger 16, plunger guide 17, wire windings 18, and a solenoid driver 20. Solenoid housing 14 may be formed from aluminum, from an engineered plastic, or from any other material capable of withstanding conditions, such as high temperatures and corrosive elements, commonly encountered in vehicle transmission applications. Plunger 16 is contained within a holder 22. In operation, solenoid driver 20 passes an electrical current through solenoid wire windings 18, thereby generating a magnetic field which powers the plunger 16 along with the holder 22, as is understood by those skilled in the art.

Solenoid housing 14 is joined with a valve casing 21 to form a pressure control device body 23. Valve casing 21 incorporates a sensor channel 24 and a pressure sensor 26. Sensor channel 24 is situated to deliver pressurized fluid to pressure sensor 26. Pressure sensor 26 is configured to generate an electrical signal indicative of the sensed fluid pressure. Valve casing 21 also includes fluid control ports 28 through which pressurized fluid is channeled to and from a control valve 30. Control valve 30 has a circular cross-section, and is moveably housed inside a cylindrical bore 32 of the valve casing 21. Pressure control device 10 is assembled inside the subject transmission by inserting the valve casing 21 piece of the device body 23 into a control device bore 36 of a valve body 34. Pressure control device 10 may be secured relative to valve body 34 by any fastening means, such as crimping, as known to those skilled in the art.

Valve body 34 includes fluid channels 38-42. Upon assembly of pressure control device 10 into valve body 34, control ports 28 are brought into fluid communication with fluid channels 38-42. Channels 38-42 are among a multitude of fluid channels within the valve body 34 configured to direct and regulate flow of pressurized fluid to and from the control valve 30. Although channels other than 38-42 are not shown, their existence would be appreciated by one skilled in the art. Among the fluid channels 38-42 of the valve body 34, channel 38 is configured to direct a supply of pressurized fluid to the control valve 30. Channel 40 may be configured to direct pressurized fluid from control valve 30 to fluid valves arranged to control transmission's torque transmitting and gear shifting elements (not shown), such as bands and clutches, for controlling transmission shift patterns and gear ratios. Channel 40 is also shown fluidly connected to sensor channel 24 which provides fluid pressure feed-back from control valve 30 to pressure sensor 26. Channel 42 may be configured to direct fluid back to the fluid pump.

Control valve 30 is moved or translated inside bore 32 by plunger 16, which is, in turn, powered via driver 20. Control valve 30 is translated to direct and balance fluid pressure to actuate the valves controlling torque transmitting and gear shifting elements, as understood by those skilled in the art. The fluid employed to actuate control valve 30 is typically supplied to the control valve by a transmission oil pump (not shown). Such fluid is generally a highly-refined, specially-formulated, mineral-based oil optimized for transmission control, friction element, and lubrication requirements.

Pressure sensor 26 is operatively connected via a communication path 44 with an integrated electrical circuit (IC) 46. Integrated circuit 46 incorporates a transceiver 48, i.e. a combined transmitter and a receiver of electrical signals. Integrated circuit 46 may be an application specific integrated circuit (ASIC). Transceiver 48 is configured to communicate with a control module 50 through a connection 52. Connection 52 facilitates feed-back control of solenoid driver 20 by control module 50. As shown in FIG. 1, connection 52 between the transceiver 48 and the control module 50 is achieved via a wireless arrangement over an appropriate radio frequency. Wireless communication via connection 52 is facilitated by an antenna 54 mounted on a transceiver 48 and an antenna 56 mounted on the control module 50. Control module 50 is located on the transmission, or elsewhere on the vehicle, external to the fluid pressure control device 10.

Integrated circuit 46 also includes a microprocessor for processing the electrical signal from pressure sensor 26, a signal conditioner, and computing data storage, i.e. memory, as understood by those skilled in the art. Integrated circuit 46 additionally includes either an analog to digital signal converter or a digital to analog signal converter. The choice of signal converter would be made in large part depending on whether the communication between integrated circuit 46 and control module 50 is accomplished in analog or digital format, and the type of signal employed to energize driver 20.

In operation, the electrical signal indicative of the sensed fluid pressure is received from pressure sensor 26 by integrated circuit 46. Following receiving the fluid pressure signal, integrated circuit 46 communicates the signal via transceiver 48 to control module 50. Utilizing an algorithm programmed into control module 50, the control module processes the signal from transceiver 48 and generates a control signal indicative of desired fluid pressure to energize solenoid driver 20. Such desired fluid pressure is typically predetermined during design and/or development of a particular transmission.

Solenoid driver 20 powers plunger 16, to thereby translate control valve 30 and regulate fluid pressure inside fluid channels 38-42. Fluid channel 40 communicates resultant fluid pressure to sensor channel 24. Pressure sensor 26 receives pressurized fluid from sensor channel 24 and generates an electrical signal indicative of the resultant fluid pressure. The electrical signal indicative of the resultant fluid pressure is received by integrated circuit 46 for processing and comparison versus the desired fluid pressure. Consequently, such feed-back communication of resultant fluid pressure via pressure sensor 26 to integrated circuit 46 facilitates closed-loop control of the fluid pressure control device 10.

Figure 2:
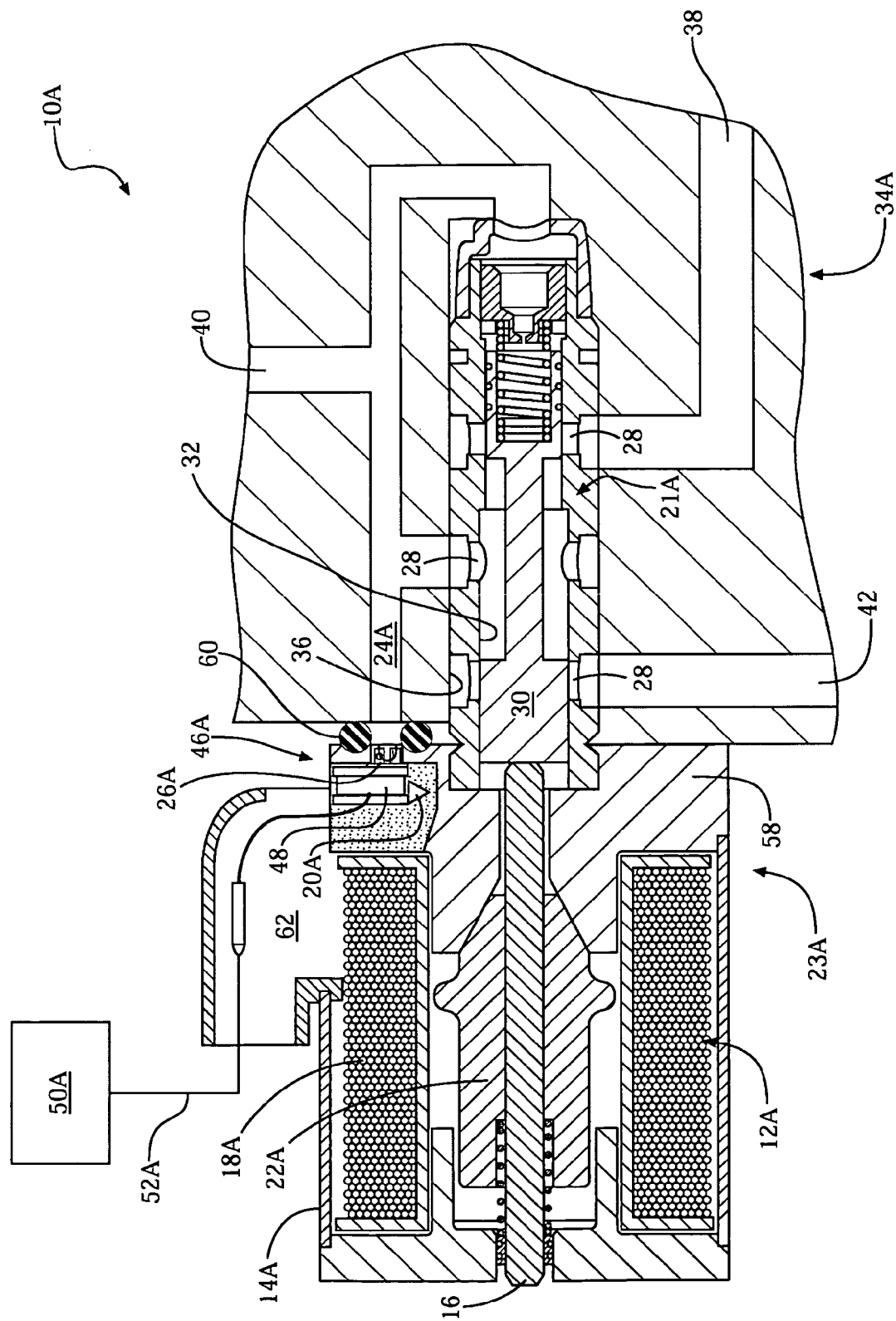
FIG. 2 is a cross-sectional schematic view of a fluid pressure control device engaged in a transmission valve body according to a second embodiment.

FIG. 2 depicts a fluid pressure control device 10A according to a second embodiment. Pressure control device 10A is in many aspects identical to pressure control device 10 described with respect to FIG. 1, and similarly functions to provide closed-loop feed-back control of fluid pressure in a vehicle transmission. Hence, all elements of fluid pressure control device 10A that are consistent with elements of fluid pressure control device 10 are labeled identically in FIG. 2. Pressure control device 10A includes a pressure control device body 23A. Device body 23A includes a face plate 58. Face plate 58 provides cover for a solenoid 12A from external environment. In addition to covering solenoid 12A, face plate 58 also serves as a guide to the plunger 16.

Solenoid housing 14A is configured to accept face plate 58, as well as to locate and center the face plate relative to holder 22A and a valve casing 21A relative to solenoid housing 14A, thereby forming the pressure control device body 23A. Face plate 58 includes integrated circuit 46A. Face plate 58 is preferably made from a moldable dielectric material in order to insulate integrated circuit 46A from electrical interference. Pressure sensor 26A and integrated circuit 46A, which includes transceiver 48 and solenoid driver 20A, are incorporated or integrated into the face plate 58. Analogous to solenoid driver 20, solenoid driver 20A passes an electrical current through solenoid wire windings 18A, thereby generating a magnetic field which powers the plunger 16 along with the holder 22A. Pressure sensor 26A mates up to a valve body 34A at a sensor channel 24A when pressure control device 10A is assembled into valve body 34A. A seal ring 60, preferably made from a suitable polymer compound, is employed between pressure sensor 26A and valve body 34A to seal the pressure sensor against the valve body and prevent fluid leakage.

As part of integrated circuit 46A incorporated or integrated into face plate 58, transceiver 48 is linked with a control module 50A by a serial communication arrangement via a wired connection 52A. Such serial communication arrangement linking transceiver 48 to control module 50A may employ a power line technique, or any other method suitable for serial communication, as understood by those skilled in the art. Wired connection 52A is facilitated via an electrical connector 62, which may be a plug-in type. Similar to integrated circuit 46, described in connection with fluid pressure control device 10 of FIG. 1, integrated circuit 46A employed in fluid pressure control device 10A includes either an analog to digital signal converter or a digital to analog signal converter.

FIG. 3 depicts a method 64 for regulating fluid pressure inside a motor vehicle transmission. The method 64 is described with reference to fluid pressure control device 10 shown in FIG. 1, but may be similarly applied to fluid pressure control device 10A shown in FIG. 2. The method 64 is initiated in frame 66, and then proceeds to frame 68. In frame 68, a fluid pressure control device 10 having holder 22, actuator 16, pressure sensor 26 and integrated circuit 46 incorporated into the holder 22, is provided. As described with respect to FIG. 1, integrated circuit 46 includes transceiver 48 and solenoid driver 20.

From frame 68, the method proceeds to frame 70, where pressurized fluid is received via the fluid pressure control device 10. The method then proceeds to frame 72, where the fluid pressure is sensed via pressure sensor 26. Following frame 72, the method advances to frame 74, where an electrical signal indicative of the sensed fluid pressure is generated via pressure sensor 26. The method then proceeds to frame 76, where the electrical signal indicative of the sensed fluid pressure is received via integrated circuit 46.

After the fluid pressure signal has been received by integrated circuit 46 in frame 76, the method proceeds to frame 78, where it is determined whether the sensed fluid pressure corresponds to desired fluid pressure. If in frame 78 the sensed fluid pressure has been determined to correspond to the desired fluid pressure, the method loops back to frame 70. If in frame 78 the sensed fluid pressure has been determined to not correspond to the desired fluid pressure, the method proceeds to frame 80 where the fluid pressure signal is transmitted to control module 50 via transceiver 48.

Following frame 80, the method advances to frame 82, where a control signal indicative of the desired fluid pressure is received from control module 50 by transceiver 48. The method then proceeds to frame 84, where plunger 16 is powered by driver 20 in response to the control signal in order to regulate the fluid pressure inside the transmission. After fluid pressure has been regulated in frame 84, the method loops back to frame 72 for sensing the resultant regulated fluid pressure, thereby generating a fluid pressure feed-back control loop.

While the best modes for carrying out the invention have been described in detail, those familiar with the art to which this invention relates will recognize various alternative designs and embodiments for practicing the invention within the scope of the appended claims.

The invention claimed is:

1. A fluid pressure control device, comprising:
    a control valve;
    an actuator in contact with the control valve;
    a fluid pressure control device body having a housing joined with a valve casing and having a face plate that includes an opening configured to receive pressurized fluid, wherein the actuator is arranged inside the housing and the control valve is arranged inside the valve casing;
    a pressure sensor incorporated into the body relative to the opening and configured to sense fluid pressure and generate an electrical signal indicative of the sensed fluid pressure; and
    an integrated circuit incorporated into the body, and operatively connected to the pressure sensor, including:
        a transceiver configured to communicate with an external device, wherein the transceiver transmits the electrical signal indicative of the sensed fluid pressure to the external device and receives a control signal from the external device; and
        a driver configured to communicate electric current and thereby power the actuator to translate the control valve inside the valve casing in response to the control signal;
    wherein the pressure sensor and the integrated circuit are contained within the face plate.

2. The fluid pressure control device of claim 1, wherein the transceiver is configured to communicate with the external device via a serial communication arrangement.

3. The fluid pressure control device of claim 2, wherein the transceiver uses a power line technique to communicate via the serial communication arrangement.

4. The fluid pressure control device of claim 1, wherein the transceiver uses a wireless arrangement for communication with the external device.

5. The fluid pressure control device of claim 1, wherein the control signal from the external device is generated based on the electrical signal indicative of the sensed fluid pressure in a feed-back control loop.

6. The fluid pressure control device of claim 1, wherein the integrated circuit further comprises one of an analog to digital signal converter and a digital to analog signal converter.

7. A transmission for a motor vehicle, the transmission comprising:
    a transmission valve body configured to regulate operation of the transmission; and
    a fluid pressure control device inserted into the valve body and including:
        a fluid valve;
        an actuator in contact with and configured to translate the fluid valve for regulating fluid pressure inside the transmission;
        a fluid pressure control device body having a housing joined with a valve casing and having a face plate that includes an opening configured to receive pressurized fluid, wherein the actuator is arranged inside the housing and the fluid valve is arranged inside the valve casing;
        a pressure sensor incorporated into the body relative to the opening and configured to sense fluid pressure and generate an electrical signal indicative of the sensed fluid pressure; and
        an integrated circuit incorporated into the body, and operatively connected to the pressure sensor, including:
            a transceiver configured to communicate with an external device, wherein the transceiver transmits the electrical signal indicative of the sensed fluid pressure to the external device, and to receive a control signal from the external device; and
            a driver configured to communicate electric current and thereby power the actuator to translate the control valve inside the valve casing in response to the control signal;
        wherein the pressure sensor and the integrated circuit are contained within the face plate.

8. The transmission of claim 7, wherein the transceiver is configured to communicate with the external device via a serial communication arrangement.

9. The transmission of claim 8, wherein the transceiver uses a power line technique to communicate via the serial communication arrangement.

10. The transmission of claim 7, wherein the transceiver uses a wireless arrangement for communication with the external device.

11. The transmission of claim 7, wherein the control signal from the external device is generated based on the electrical signal indicative of the sensed fluid pressure in a feed-back control loop.

12. The transmission of claim 7, wherein the electrical circuit further comprises one of an analog to digital signal converter and a digital to analog signal converter.

13. A fluid pressure control device, comprising:
   a control valve;
   an actuator in contact with the control valve;
   a fluid pressure control device body having a housing joined with a face plate and the face plate joined with a valve casing, the face plate having an opening configured to receive pressurized fluid, wherein the actuator is arranged inside the housing and the control valve is arranged inside the valve casing;
   a pressure sensor incorporated into the body relative to the opening and configured to sense fluid pressure and generate an electrical signal indicative of the sensed fluid pressure; and
   an integrated circuit incorporated into the body, and operatively connected to the pressure sensor, including:
      a transceiver configured to communicate with an external device, wherein the transceiver transmits the electrical signal indicative of the sensed fluid pressure to the external device and receives a control signal from the external device; and
      a driver configured to communicate electric current and thereby power the actuator to translate the control valve inside the valve casing in response to the control signal;
   wherein the pressure sensor and the integrated circuit are contained within the face plate.

14. The fluid pressure control device of claim 13, wherein the transceiver is configured to communicate with the external device via a serial communication arrangement.

15. The fluid pressure control device of claim 14, wherein the transceiver uses a power line technique to communicate via the serial communication arrangement.

16. The fluid pressure control device of claim 13, wherein the transceiver uses a wireless arrangement for communication with the external device.

17. The fluid pressure control device of claim 13, wherein the control signal from the external device is generated based on the electrical signal indicative of the sensed fluid pressure in a feed-back control loop.

18. The fluid pressure control device of claim 13, wherein the integrated circuit further comprises one of an analog to digital signal converter and a digital to analog signal converter.

* * * * *